(12) United States Patent
Reed et al.

(10) Patent No.: US 12,265,403 B2
(45) Date of Patent: Apr. 1, 2025

(54) DOME-LOADED PRESSURE REDUCING REGULATOR FOR SINGLE USE APPLICATIONS

(71) Applicant: Equilibar, LLC, Fletcher, NC (US)

(72) Inventors: David A. Reed, Hendersonville, NC (US); Ryan Matthew Heffner, Asheville, NC (US); Lyle Hartman Hamilton, Cincinnati, OH (US); Tony Boyd Tang, Mills River, NC (US); Zachary Allan Cobb, Candler, NC (US); Carlyle Leonard Donevant, IV, Asheville, NC (US)

(73) Assignee: Equilibar, LLC, Fletcher, NC (US)

( * ) Notice: Subject to any disclaimer, the term of this patent is extended or adjusted under 35 U.S.C. 154(b) by 50 days.

(21) Appl. No.: 18/267,584

(22) PCT Filed: Feb. 10, 2022

(86) PCT No.: PCT/US2022/015916
§ 371 (c)(1),
(2) Date: Jun. 15, 2023

(87) PCT Pub. No.: WO2022/173903
PCT Pub. Date: Aug. 18, 2022

(65) Prior Publication Data
US 2024/0053779 A1 Feb. 15, 2024

Related U.S. Application Data

(60) Provisional application No. 63/147,996, filed on Feb. 10, 2021.

(51) Int. Cl.
*G05D 16/06* (2006.01)

(52) U.S. Cl.
CPC ..... *G05D 16/0666* (2013.01); *G05D 16/0691* (2013.01)

(58) Field of Classification Search
CPC ........... G05D 16/0666; G05D 16/0663; G05D 16/0644; G05D 16/065; G05D 16/0691
See application file for complete search history.

(56) References Cited

U.S. PATENT DOCUMENTS 1,003,916 A * 9/1911 Koenig .............. G05D 16/0663
251/146
2,049,382 A * 7/1936 Deming ............. G05D 16/0663
251/321

(Continued)

FOREIGN PATENT DOCUMENTS

DE 2507307 A * 9/1975 ......... F02M 37/0023
GB 871133 A * 6/1961

(Continued)

OTHER PUBLICATIONS

International Search Report and Written Opinion issued on May 4, 2022 for International Patent Application No. PCT/US22/15916.

*Primary Examiner* — David Colon-Morales
(74) *Attorney, Agent, or Firm* — Shumaker, Loop & Kendrick, LLP; Jonathan M. Hines (57) ABSTRACT

A centerbody assembly for a pressure regulator includes: a centerbody having a process surface, at least one outlet orifice disposed in the centerbody; an outlet port positioned in fluid communication with the at least one outlet orifice; an inlet port; a valve chamber positioned in the centerbody in fluid communication with the inlet port, the valve chamber including a valve seat positioned in fluid communication with the process surface; a spherical valve element disposed in the valve chamber and moveable between an open position in which it is spaced away from the valve seat, and a closed position in which it seals against the valve seat; a (Continued)

flexible control diaphragm facing the process surface, wherein a perimeter of the control diaphragm is bonded to the centerbody so as to define a seal that blocks the passage of fluid; and wherein the valve element is mechanically interconnected with the control diaphragm.

16 Claims, 9 Drawing Sheets

(56) References Cited

U.S. PATENT DOCUMENTS

| | | | | |
|---|---|---|---|---|
| 2,156,823 A * | 5/1939 | Stettner | G05D 16/0663 | 137/550 |
| 2,192,141 A * | 2/1940 | Mcelwaine | G05D 16/0663 | 137/505.11 |
| 2,272,243 A * | 2/1942 | Jacobsson | G05D 16/0663 | 137/454.5 |
| 2,343,146 A * | 2/1944 | Jenkins | G05D 16/0663 | 137/316 |
| 2,348,388 A * | 5/1944 | Jenkins | G05D 16/0663 | 251/335.2 |
| 2,585,575 A | 2/1948 | Nedergaard | | |
| 2,777,456 A * | 1/1957 | Ey | G05D 16/0663 | 137/73 |
| 3,921,664 A * | 11/1975 | Almquist | F02M 37/0023 | 137/553 |
| 4,513,775 A * | 4/1985 | Stoltman | F02M 21/0239 | 137/491 |
| 4,627,463 A * | 12/1986 | Johnstone | G05D 16/0658 | 251/84 |
| 4,630,637 A * | 12/1986 | Furst | G05D 16/0663 | 137/340 |
| 4,768,548 A * | 9/1988 | Maurer | G05D 16/2086 | 137/487.5 |
| 4,846,215 A * | 7/1989 | Barree | F16K 7/17 | 137/859 |
| 4,936,342 A * | 6/1990 | Kojima | F02M 69/54 | 251/126 |
| 5,111,793 A * | 5/1992 | Deeds | G05D 16/0666 | 123/457 |
| 5,113,831 A * | 5/1992 | Grant | G05D 16/0661 | 123/457 |
| 5,113,898 A * | 5/1992 | White | G05D 16/0666 | 137/454.5 |
| 5,213,126 A * | 5/1993 | Ono | G05D 16/0666 | 137/15.22 |
| 5,680,703 A * | 10/1997 | Ono | B23P 15/001 | 137/15.19 |
| 6,056,009 A * | 5/2000 | Powell | F02M 69/54 | 137/505.42 |
| 7,673,650 B2 * | 3/2010 | Jennings | F16K 31/1266 | 137/494 |
| 8,215,336 B2 * | 7/2012 | Jennings | F16K 27/0236 | 137/512.15 |
| 9,447,890 B2 * | 9/2016 | Jennings | G05D 16/063 | |
| 11,193,703 B1 | 12/2021 | Heffner et al. | | |
| 11,448,327 B2 | 9/2022 | Heffner et al. | | |
| 2003/0192589 A1 * | 10/2003 | Jennings | F16K 31/1266 | 137/115.13 |
| 2020/0355277 A1 | 11/2020 | Heffner et al. | | |
| 2022/0011030 A1 | 1/2022 | Heffner et al. | | |
| 2022/0381351 A1 | 12/2022 | Heffner et al. | | |
| 2023/0151899 A1 | 5/2023 | Cobb et al. | | |

FOREIGN PATENT DOCUMENTS

| | | | | |
|---|---|---|---|---|
| GB | 2106613 A * | 4/1983 | | G05D 16/0619 |
| JP | 58068121 A * | 4/1983 | | |
| WO | 2005010418 | 12/2005 | | |
| WO | 2012178132 | 12/2012 | | |
| WO | 2019094379 | 5/2019 | | |
| WO | WO-2019094379 A1 * | 5/2019 | | F16K 15/144 |
| WO | 2021203003 | 10/2021 | | |
| WO | 2022173903 | 8/2022 | | |
| WO | 2022187338 | 9/2022 | | |

* cited by examiner

DOME-LOADED PRESSURE REDUCING REGULATOR FOR SINGLE USE APPLICATIONS

BACKGROUND OF THE INVENTION

The present invention relates to pressure regulators, and more particularly to pressure regulators which are suitable for single-use applications.

Pressure reducing regulators exist in many varieties throughout industry, including many sanitary designs for food and bio-pharmaceutical manufacturing ("biopharma"). The basic functionality is similar for each of these designs, with a diaphragm or platen sensing pressure downstream of a valve, and a means for setting the force on the diaphragm or platen to create a set-point pressure. When the downstream pressure is less than desired, the platen moves such that the valve opens, and when the downstream is equal to or exceed requirements, the platen moves to close the valve.

Many design variants exist for the valve, with a classic needle or globe-style valve seat most common. Biasing springs are often used to put the valve in the right default position. Force on the platen is usually provided by a spring, but can also be provided by a pneumatic pressure.

In certain industries, especially bio-pharma, there is a desire to reduce overhead costs associated with cleaning and validation of a sterile work environment.

BRIEF SUMMARY OF THE INVENTION

This need is addressed by a pressure reducing regulator that utilizes a ball as a valve element, in conjunction with a diaphragm for pressure sensing.

According to one aspect of the technology described herein, a centerbody assembly for a pressure regulator includes: a centerbody having: a process surface, at least one outlet orifice disposed in the centerbody; an outlet port positioned in fluid communication with the at least one outlet orifice; an inlet port; a valve chamber positioned in the centerbody in fluid communication with the inlet port, the valve chamber including a valve seat positioned in fluid communication with the process surface; a spherical valve element disposed in the valve chamber and moveable between an open position in which it is spaced away from the valve seat, and a closed position in which it seals against the valve seat; a flexible control diaphragm facing the process surface, wherein a perimeter of the control diaphragm is bonded to the centerbody so as to define a seal that blocks the passage of fluid; wherein the valve element is mechanically interconnected with the control diaphragm.

BRIEF DESCRIPTION OF THE DRAWINGS

The invention may be best understood by reference to the following description taken in conjunction with the accompanying drawing figures in which.

DETAILED DESCRIPTION OF THE INVENTION

Now, referring to the drawings wherein identical reference numerals denote the same elements throughout the various views, FIGS. 1-7 illustrate an exemplary pressure regulator 10. The basic components of the pressure regulator 10 are a centerbody assembly 12 and an enclosure assembly 14 including a top cap (or reference cap) 16 and a cradle 18.

The centerbody assembly 12 includes a centerbody 20 having a first side defining a process surface 22, and an opposed second side defining a back surface 24. Both of the surfaces 22, 24 are generally planar in the illustrated example, but different geometries may be used, for example, the surfaces 22, 24 may include various recesses or protrusions. In this example, the process surface 22 is recessed from the top edge 26 of the centerbody 20. Analysis has shown that performance of the device can be optimized by careful selection of a ratio of the diameter of the process surface 22 (working area diameter) to the recess depth of the process surface 22 from the top edge 26. For example, this ratio may be from 9:1 to 16:1.

A valve chamber 28 is formed in the centerbody 20. In this particular example it extends from the process surface 22 to the back surface 24, along a vertical reference axis "A" oriented perpendicular to the process surface 22. The valve chamber 28 may incorporate features for guiding and aligning a valve element (described below) while minimizing friction. In the illustrated example, the periphery of the valve chamber 28 includes a radial array of alternating grooves 30 and lands 32.

A portion of the valve chamber 28 adjacent the process surface 22 is formed into a valve seat 34. In the illustrated example, the valve seat 34 is annular and has a conical surface. The valve seat geometry is discussed in more detail below.

At least one outlet orifice 36 is formed in the centerbody 20 communicating with the process surface 22.

The centerbody 20 includes an inlet fitting 38 defining an inlet port 40 of the pressure regulator 10, and an outlet fitting 42 defining an outlet port 44 of the pressure regulator 10.

An inlet manifold 46 is formed integrally with the centerbody 20 and forms a fluid connection between the valve chamber 28 and the inlet fitting 38.

An outlet manifold 48 is formed integrally within the centerbody 20 and forms a fluid connection between the outlet orifices 36 and the outlet fitting 42.

The inlet and outlet fittings 38 and 42 may be functionally and/or structurally integral to the centerbody 20. In one example, the fittings 38, 42 may be formed as a physically unitary or integral part of the centerbody 20, for example by molding, additive manufacturing, or machining.

In another example, inlet and outlet fittings 38, 42 may be manufactured separately and then fit into the centerbody 20. Examples of suitable materials include metal alloys such as stainless steel, or thermoplastic materials. The fittings 38, 42 may be press fitted into the centerbody 20, the interference providing a secure joint. In one exemplary combination, stainless steel barbs would be press fit into a thermoplastic centerbody 20 having a Shore D hardness greater than 55. For the most secure press fit, the Shore D hardness of the centerbody 20 may be greater than 70. Alternatively, the fittings 38, 42 may be bonded to the centerbody 20 using a process such as spin welding or ultrasonic welding (if both the centerbody 20 and the fittings 38, 42 are polymer).

The centerbody 20 may be manufactured using various methods such as machining from a block of precursor material, additive manufacturing processes (e.g., "3-D printing"), or molding from a polymer suitable for the application requirements. For best performance in a single-use application where sterility is important, a polymer with United States Pharmacopeia ("USP") class VI certification may be used. Nonlimiting examples of such materials include polyolefin (e.g., polyethylene, LDPE, HDPE, UHMWPE), PEEK, acetal polymer (e.g., DELRIN), PTFE, and PFA.

Figure 5:
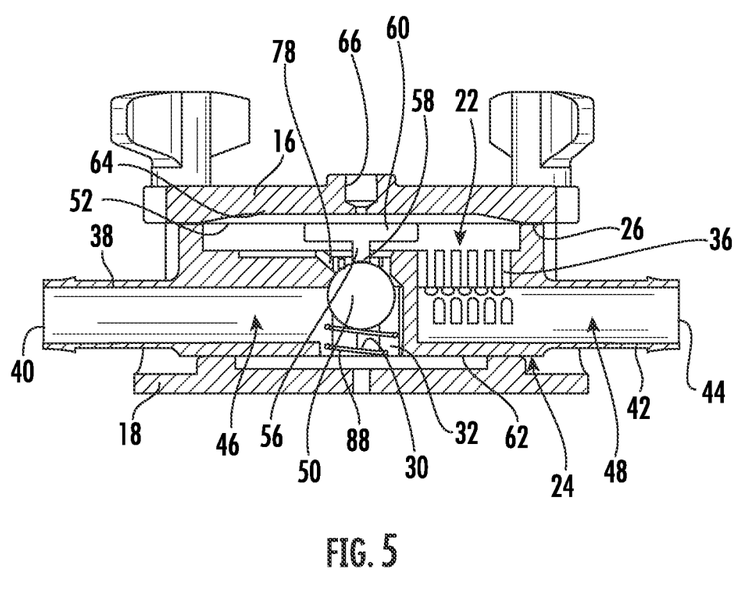
FIG. 5 is a cross-sectional view of the pressure regulator shown in FIG. 1.
Figure 6:
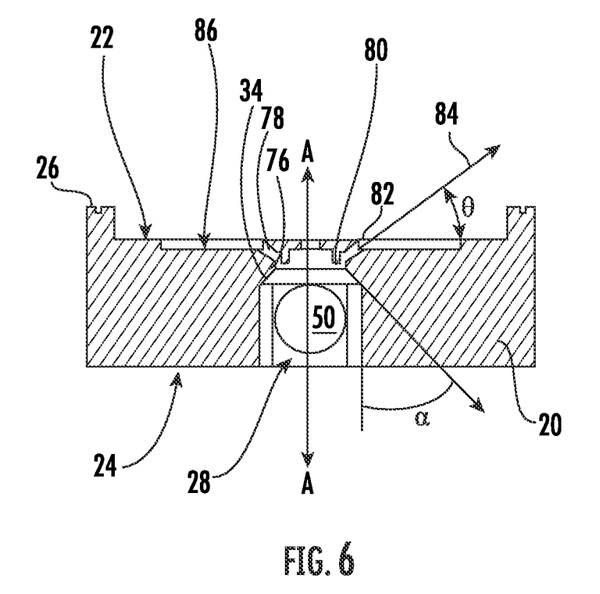
FIG. 6 is an enlarged view of a portion of FIG. 5.

A valve element 50 is disposed in the valve chamber 28. In general, a valve element that is a body of revolution is useful for providing uniform sealing. A sphere in particular has been found to be a very stable geometry. In the illustrated example, the valve element is a sphere. For purposes of this description, the valve element may be referred to as a "ball". As described in more detail below, it is moveable between a first, open position in which it is spaced away from the valve seat 34, permitting fluid flow between the inlet port 40 and the process surface 22, and a second, closed position in which it seals against the valve seat 34, blocking fluid flow between the inlet port 40 and the process surface 22. The relative dimensions of the valve chamber 28 and the ball 50 may be selected to permit free fluid flow around the ball 50 in the open position while also constraining excess movement. In one example, the ratio of the diameter of the valve chamber 28 (measured across the lands 32) to the ball outside diameter may be in the range of 1:1 to 1.5:1.

The valve element 50 may be manufactured using various methods such as machining from a block of precursor material, additive manufacturing processes (e.g., "3-D printing"), or molding from a polymer suitable for the application requirements. For best performance in a single-use application where sterility is important, a polymer with United States Pharmacopeia ("USP") class VI certification may be used. Nonlimiting examples of such materials include polyolefin (e.g., polyethylene, LDPE, HDPE, UHMWPE), PEEK, acetal polymer (e.g., DELRIN), PTFE, and PFA.

A flexible control diaphragm or membrane 52 is disposed adjacent the process surface 22. For best performance in a single-use application where sterility is important, the control diaphragm 52 may be made from a material with USP class VI certification. Nonlimiting examples of such materials include TPU, TPE, polyolefin (LDPE, HDPE, UHMWPE, PP, etc.), PEEK, PTFE, PFA, FEP, a sulfone polymer such as RADEL, silicone, or other similar thermoplastic elastomer such as SANTOPRENE.

The control diaphragm 52 has opposed sides, referred to as reference and process sides, with the process side facing the process surface 22. The perimeter of the control diaphragm 52 is sealed to the centerbody 20. As used herein, the term "sealed" implies that a boundary is present that blocks the passage of fluid, with the understanding that such boundary is not required to resist any specific magnitude of pressure differential. Rather, the seal is for the purpose of ensuring that the control diaphragm 52 is in the correct position and secured in robust enough manner to stay in place and maintain sterility during shipping and assembly.

Some nonlimiting examples of methods of creating a suitable seal include bonding methods, such as thermal bonding, sonic bonding, or adhesive bonding. In the case of thermal bonding, in some circumstances it may be necessary to provide a diaphragm having a thicker central portion to interact with the strut described below, and a thinner peripheral portion to weld to the centerbody 20. This may done by providing a tapered thickness, a peripheral lip, or a stacked or laminated construction. Other options for sealing the control diaphragm 52 to the centerbody 20 include mechanical seals (not illustrated).

The valve element 50 is mechanically interconnected to the control diaphragm 52 such that compressive forces can be transferred between the two components. In the illustrated example, a strut 54 is positioned between the control diaphragm 52 and the valve element 50. The strut 54 includes a shaft 56 passing through the centerbody 20, with a lower end 58 that contacts the valve element 50. A disk 60 is formed at the upper end of the shaft 56. The disk 60 is effective to spread out the force communicated from the strut 54 to the control diaphragm 52 so that concentrated point loads are not imparted to the control diaphragm 52.

Referring to FIG. 5, in the illustrated example, the valve chamber 28 is formed as a through-passage, which must be sealed off at the back surface 24 in order to define the appropriate fluid flowpath. For this purpose, a backside diaphragm or membrane 62 may be positioned adjacent the back surface 24. In one example, a thickness of the backside diaphragm 62 is less than 0.5 mm (0.02 inches). In another example it may be less than 0.25 mm (0.01 inches). The backside diaphragm 62 could be made from any of the materials listed for the control diaphragm 52. The perimeter of the backside diaphragm 62 is sealed to the centerbody 20. The backside diaphragm 62 may optionally include some features to absorb pulsations in the fluid system, such as compressible structures or materials or springs (not shown).

The control diaphragm 52 may be contained by any support structure that is strong enough to provide physical support for the control diaphragm 52 up to the intended use pressure. Nonlimiting examples of potential maximum pressures include: up to 70 kPa (10 psi), up to 400 kPa (60 psi), or up to 1000 kPa (150 psi). The support structure may be constructed so as to be reusable. For example, it may be made of a metal or metal alloy such as stainless steel. The support structure may be easily cleanable. In one example, the support structure has a surface finish of less than 32 RA (micro inch).

Figure 1:
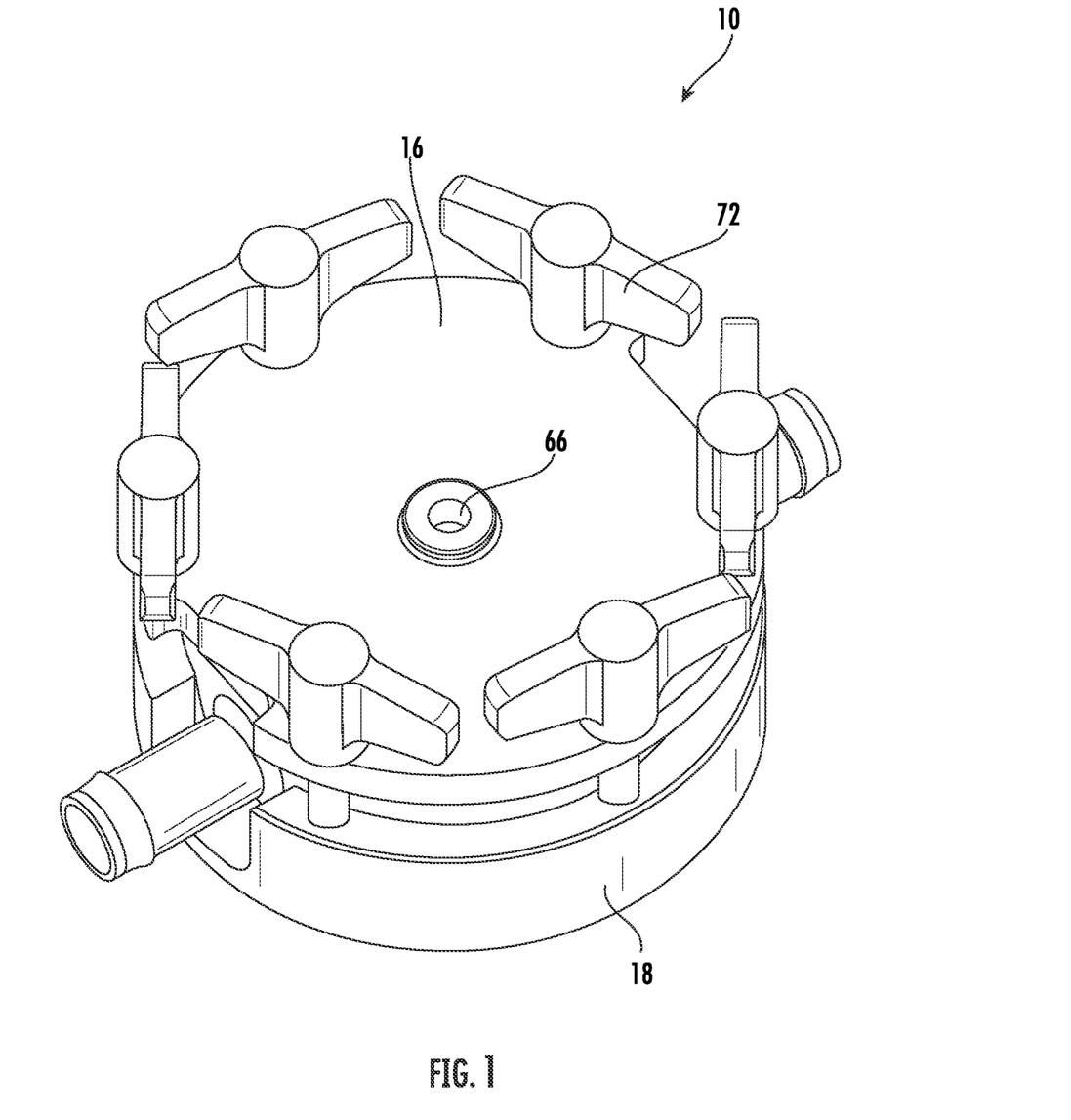
FIG. 1 is a top perspective view showing an exemplary embodiment of a pressure regulator.
Figure 2:
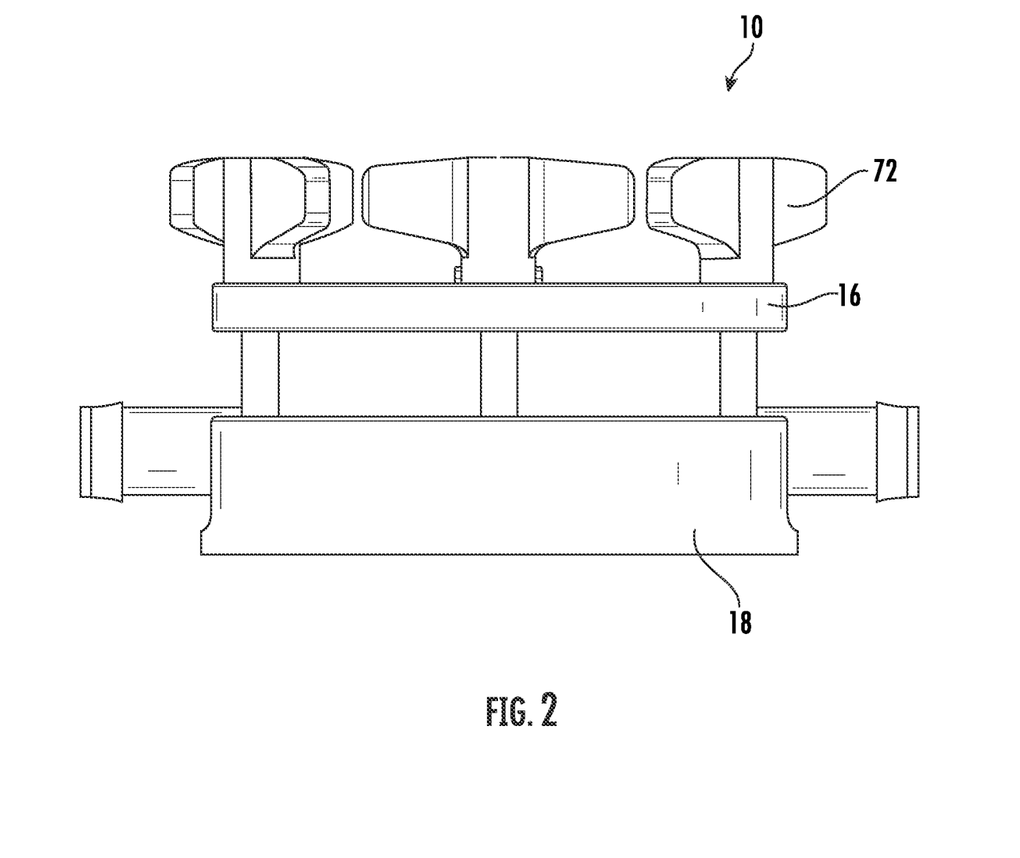
FIG. 2 is a side view of the pressure regulator shown in FIG. 1.
Figure 3:
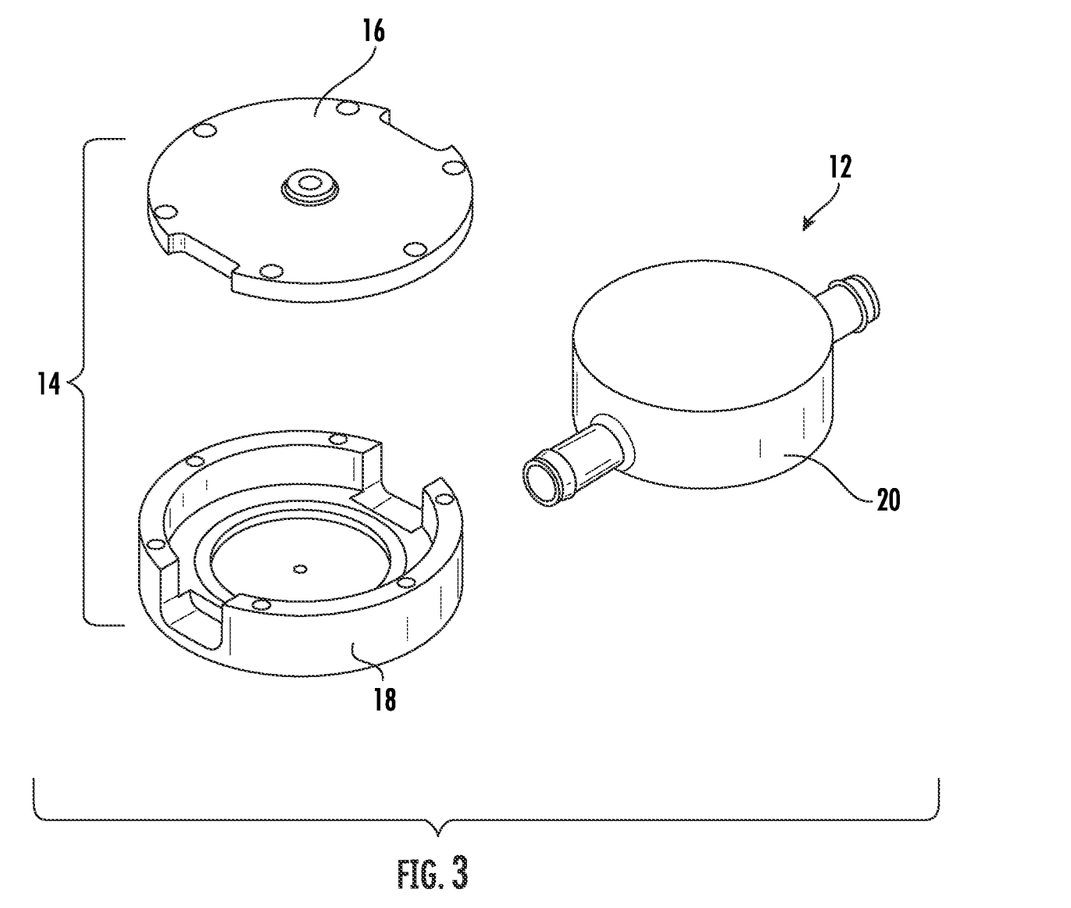
FIG. 3 is a partially exploded view of the pressure regulator shown in FIG. 1.
Figure 4:
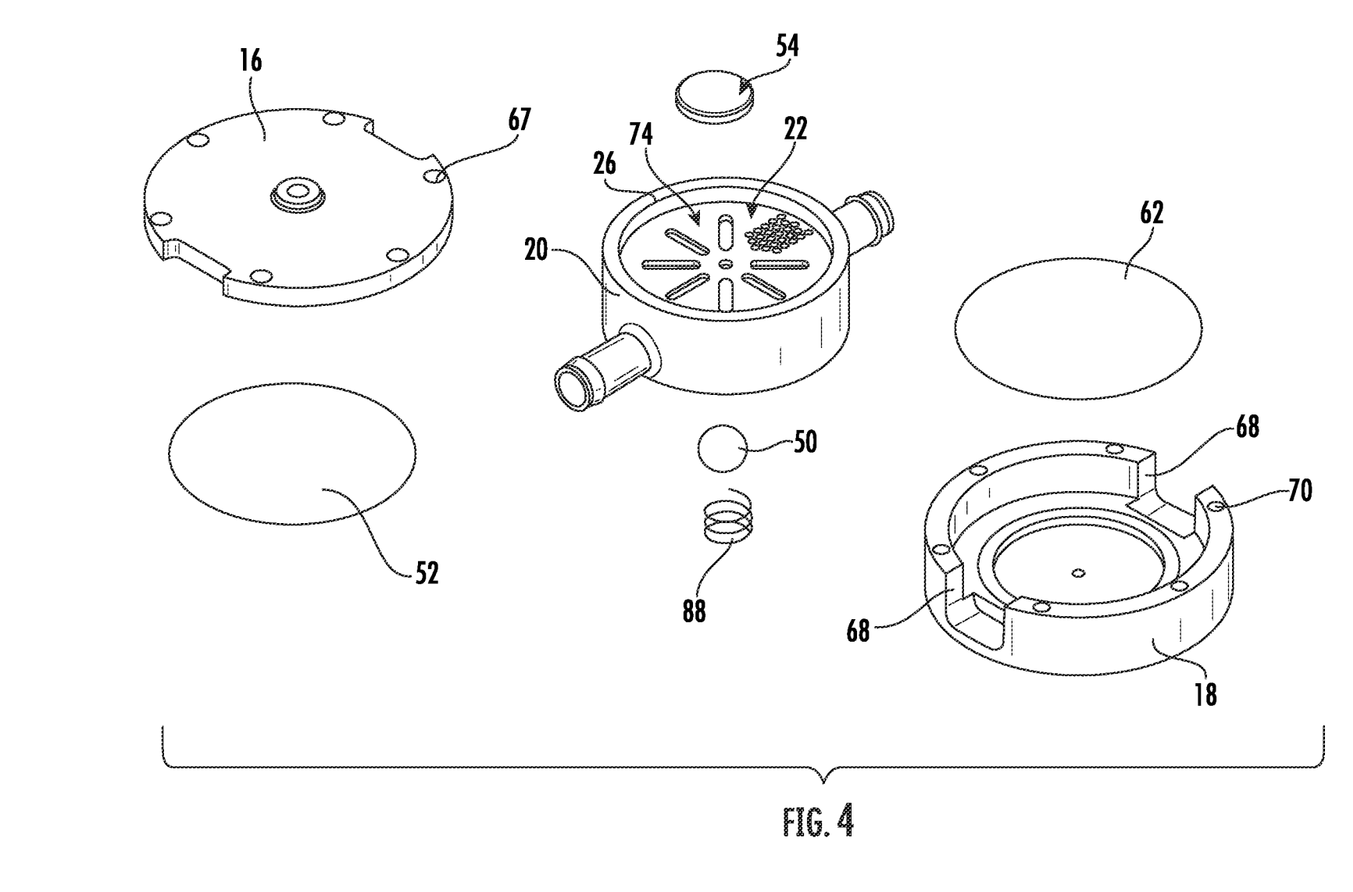
FIG. 4 is an exploded view of the pressure regulator shown in FIG. 1.

In the illustrated example, the enclosure assembly 14 includes top cap 16 which serves as a support structure for the control diaphragm 52. The top cap 16 has a disk-like shape with an internal reference cavity 64 and an integral reference port 66 connected in fluid communication with the reference cavity 64. It also includes an array of bolt holes 67 around its periphery.

In similar fashion, the backside diaphragm 62 may be supported by reusable support structure to provide greater pressure rating while minimizing the quantity of single-use material. The configuration and material of the support structure for the backside diaphragm 62 may be similar to that of the support structure for the control diaphragm 52.

In the illustrated example, the enclosure assembly 14 includes cradle 18 which serves as a support structure for the backside diaphragm 62. The cradle 18 has a short cylindrical shape with clearance openings 68 for the inlet and outlet fittings 38, 42 described above. It also includes an array of internally-threaded bolt holes 70 around its periphery.

Means are provided for joining the components of the enclosure assembly 14 and to hold pressure forces. In the illustrated embodiment, seen in FIG. 1, an array of clamp bolts 72 pass through the bolt holes 67 of the top cap 16 and are threaded into the bolt holes 70 of the cradle 18. Gaskets or seals of a confirmable material such as rubber (not shown) may be used between the top cap 16 and the centerbody 20 and/or between the cradle 18 and the centerbody 20. This would allow for warping tolerance on assembled components.

Optionally, the support structure may provide reinforcement to the perimeter seal of the control diaphragm 52 and/or the backside diaphragm 62 by a crush seal configuration, allowing the centerbody assembly 12 to be rated to higher pressure than could be withstood by the single-use components alone. In the illustrated example, this crush seal is provided by clamping of selected portions of the centerbody assembly 12 between the top cap 16 and the cradle 18.

An example of this construction would be a thin diaphragm that may be suitable for use at maximum pressures in a range of 14 kPa (2 psi) to 70 kPa (10 psi), considering normal safety factors of 1.5λ to 2λ relative to hydrostatic failure, without structural reinforcement. With the enclosure assembly 14 described above providing structural support of the perimeter bonds, the combination may be suitable for use up to 70 kPa (10 psi), up to 400 kPa (60 psi), or up to 1000 kPa (150 psi), or even higher pressures, again considering normal safety factors of 1.5λ to 2λ relative to hydrostatic failure.

When assembled, fluid pressure on the top of the control diaphragm 52 acting through strut 60 can depress the valve element 50 out of sealing contact with the valve seat 34 when the downstream pressure is less than the desired set-point. The pressure regulator 10 will control pressure in a manner similar to other pressure regulators, in the sense that force balance relative to the fluid versus setpoint forces equalize with respect to the valve element position, adjusting valve closure to control downstream pressure.

Various dimensions of the pressure regulator components may be selected to result in a desired performance pressure regulator 10 while minimizing pressure pulsations in operation. Analysis has shown several component relationship which are helpful for good performance. Some examples are listed below.

In one example, a ratio of the ball diameter to the inlet port diameter may be between 1.1:1 and 1.6:1. In one example, the ratio may be approximately 1.2:1.

A ratio of sealing ring diameter (i.e. diameter of a ring defining the contact between the ball 50 and the valve seat 34) to ball diameter is important to provide proper sealing forces. Performance will generally be better as the ratio approaches 1:1. A practical range of sealing diameter divided by ball diameter is believed to be between 0.5 and 1.

The ball and valve seat interface will be a major factor in establishing the sensitivity and responsiveness of the pressure regulator 10. In one example, the maximum amount of movement of the ball 50 may be between 5% and 30% of ball diameter. In another example, the maximum amount of movement of the ball 50 may be between 15% and 25% of ball diameter. In yet another example, the maximum amount of movement of the ball 50 is approximately 20% of ball diameter. Limited ball movement is also helpful in reducing oscillations of the ball 50. The movement of the ball 50 will also be a function of the valve seat shape and orientation, which may be simple or complex. For simplicity, the valve seat 34 may have a conical shape (i.e. a straight taper when viewed in cross section), with a valve seat angle α of approximately 45 degrees. Alternatively, different angles and or curved valve seat shapes could be used to adjust the Cv vs. ball position curve. To achieve shutoff goals for specific end uses, the valve seat 34 may incorporate a different material at the location of contact with the ball 50. For example, it could incorporate an O-ring (not shown) of selected hardness relative to the material of the ball 50. Appropriate material selection can result in specific shutoff performance as defined by applicable industry standards, e.g., a specific ANSI Class shutoff. In one example, ANSI Class VI may be achieved.

The control diaphragm 52 will play some factor in the sensitivity of the pressure regulator 10, and the working diaphragm area to ball area will be relevant to sensitivity.

The working diaphragm area of the pressure regulator 10 is defined as the maximum wetted diameter of the control diaphragm 52. The ratio of the working area diameter to ball diameter will offer more sensitivity as the ratio increases in value. Analysis has shown that a ratio that provide good performance while being practical to manufacture is a ratio between 2.5:1 and 6:1. In one example, the diameter ratio is approximately 4.6:1. The area ratio will be different than the diameter ratio.

The pressure regulator as described above is operable to regulate downstream pressure in a system. In some circumstances, a pressure regulator of this description may exhibit resonance issues with the use of a lightweight ball for control, causing pulsations, water hammer, or other fluctuation phenomenon that will vary downstream pressure through pressure regulator action. This behavior cannot be tolerated in certain applications. Accordingly, the pressure regulator 10 may incorporate one or more damping features.

One damping feature is a flow diverter which functions to change the flow direction of fluid passing by the ball 50, thus changing the direction of the force vector acting on the ball 50. Stated another way, the fluid flow pathlines may be forced in a direction which has a greater component parallel to the process surface 22 than a component perpendicular to it. One example of a suitable flow diverter structure is labeled 74 in FIG. 4.

Figure 7:
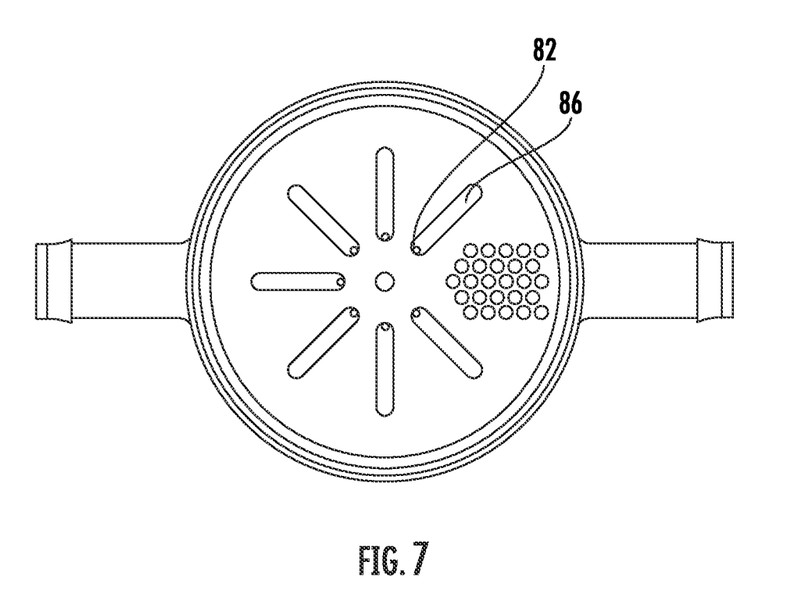
FIG. 7 is a top plan view of a centerbody of the pressure regulator of FIG. 1.

Referring to FIGS. 5-7, a transition conduit 76 is positioned between the valve seat 34 and the process surface 22 of the centerbody 20. At least one damping port 78 extends through the centerbody 20 and has a first end 80 communicating with the transition conduit 76 and a second end 82 communicating with the process surface 22. A longitudinal axis 84 of the damping port 78 is disposed at an acute angle θ to the process surface, as measured at the damping port exit. In the illustrated example, there are a plurality of damping ports 78 and they are arranged in a radial array about centerbody axis A. In this particular example, the second end 82 of each damping port 78 terminates in an elongated recess 86 formed in the process surface.

Figure 10:
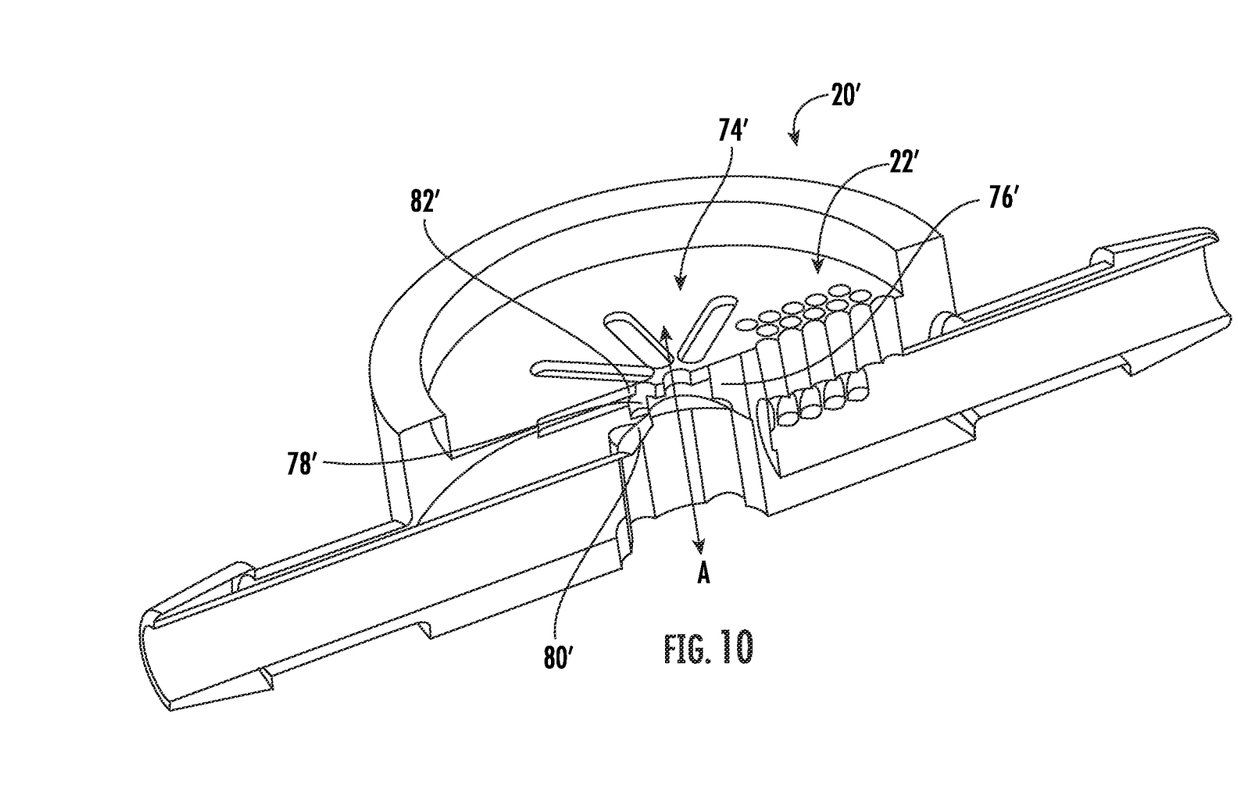
FIG. 10 is a cross-sectional view of an alternative centerbody configuration.

Other structures which force the flow pathline more parallel may be used. FIG. 10 illustrates a centerbody 20' incorporating an alternative flow diverter structure 74'. At least one damping port 78' extends through the centerbody 20' and has a first end 80' communicating with the transition conduit 76' and a second end 82' communicating with the process surface 22'. The damping port 78 includes one or more surfaces disposed at right angles such that a direct line of sight along axis A is partially occluded, effectively making the fluid flow pathline from the valve chamber have a greater component parallel to the process surface 22' than a component perpendicular to it. In the illustrated example, there are a plurality of damping ports 78 and they are arranged in a radial array about centerbody axis A. This configuration may be simpler to manufacture than other configurations.

Another damping feature is a spring element which functions to change the force balance on the ball 50 by biasing it towards a closed position. In the illustrated example, a spring element 88 is disposed in the valve chamber 28 between the ball 50 and the cradle 18. In this particular example, a coil-type compression spring is shown. The properties of the spring element 88, e.g., its overall diameter, overall length, wire diameter, coil spacing, and alloy, are selected to produce a closing force on the ball 50. As one example, testing has shown that a relatively light spring having a spring constant of 0.18 N/m (1 lb./in.) to 1.4 N/mm (8 lb./in.) is sufficient to provide weak dampening and a modest upward force to allow the ball 50 to quickly close when needed. Other types of spring elements may be used as alternatives to the coil spring. For example, a plug of polymer material such as silicone foam (not shown) could be substituted for the coil spring.

Figure 8:
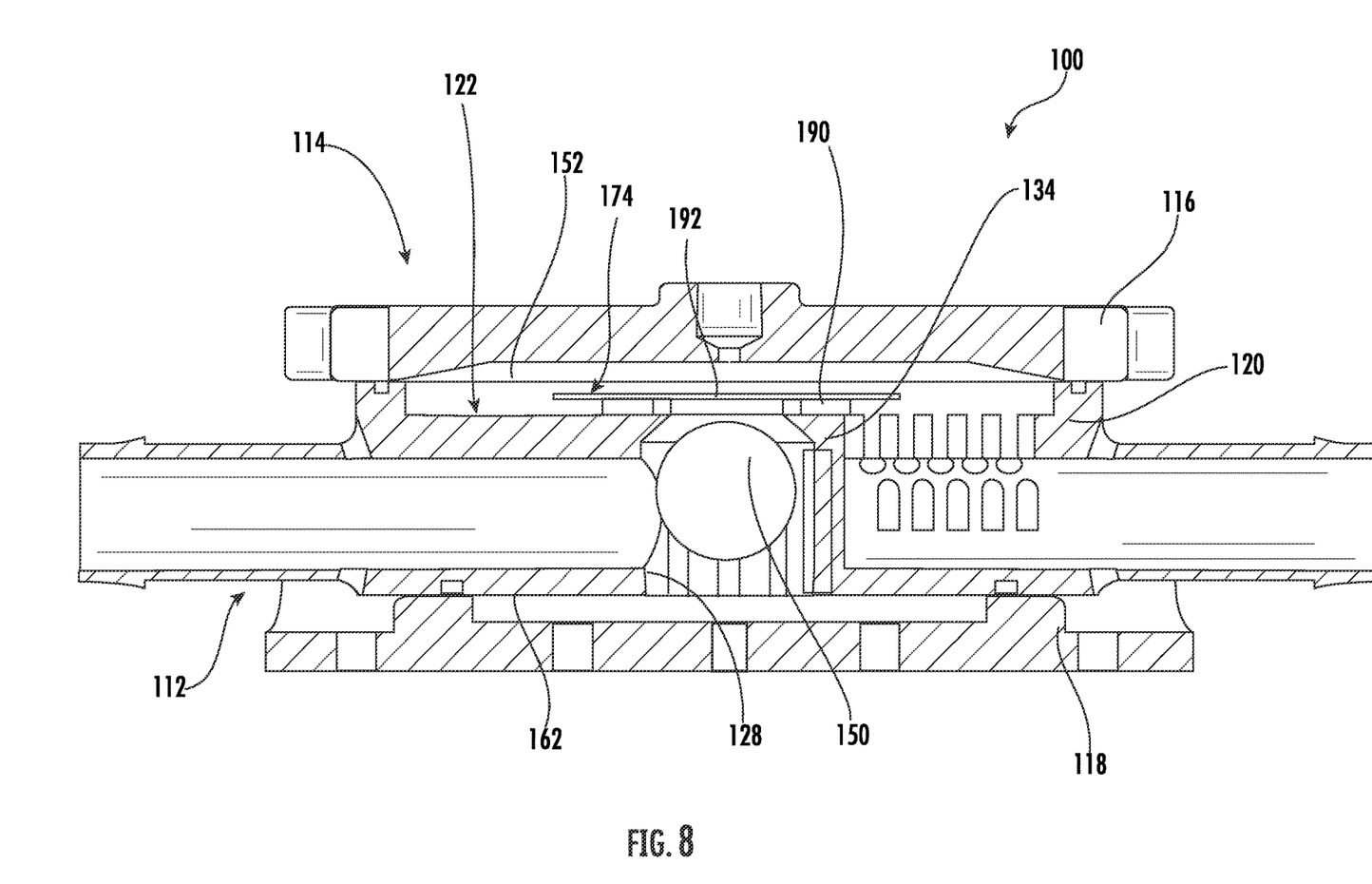
FIG. 8 is a flow diagram of the pressure regulator of FIG. 1 connected to a fluid system.

Different physical implementations of diaphragm pressure regulator utilizing a sphere as a sealing element are possible. For example, FIG. 8 illustrates an alternative pressure regulator 100 similar in overall construction to the pressure regulator 10 described above. Elements of the pressure regulator 100 not explicitly described may be taken to be identical to the pressure regulator 10.

The pressure regulator 100 includes a centerbody assembly 112 and an enclosure assembly 114 including a top cap (or reference cap) 116 and a cradle 18.

The centerbody assembly 112 includes a centerbody 120 with a control diaphragm 152 and optional backside diaphragm 162 substantially as described above.

The centerbody assembly 112 includes a valve chamber 128 and a valve seat 134. A ball 150 is disposed in the valve chamber 128.

Unlike the pressure regulator 10 described above, no strut is used. Rather, the valve seat 134 is positioned sufficiently close to the process surface 122 of the centerbody 120 that the ball 150 protrudes above the process surface 122 in operation. The ball 150 directly contacts the control diaphragm 152.

In this embodiment, the control diaphragm 152 needs to be stiff enough on the top of the ball 150 to prevent too much conformance to the spherical shape. This stiffness can be provided by either an integral stiffening feature (platen-like feature, but with smooth interior surfaces), such as a thicker center section and thinner section around the periphery of the diaphragm to allow for subtle movements in response to pressure.

The interfacing face between the centerbody 120 and the control diaphragm 152 is configured to prevent disruption of the valve closure. In the illustrated example, this is implemented by providing an appropriately configured flow diverter structure 174. The flow diverter structure 174 includes a disk 192 spaced away from the process surface 122 by an array of ribs 190. The spaces between the ribs 190 define at least one damping port 178. (The disk 192 may be provided with a hole to permit the ball 150 to directly contact the control diaphragm 152 as described above). The height of the flow diverter structure 174 is selected taking into account the ratio of the ball to valve opening. The flow diverter structure 174, in addition to its flow streamline redirection function, prevents the control diaphragm 152 from "over-opening" the ball 150 and allowing the control diaphragm 152 itself to begin to restrict flow through the valve seat 134.

Figure 9:
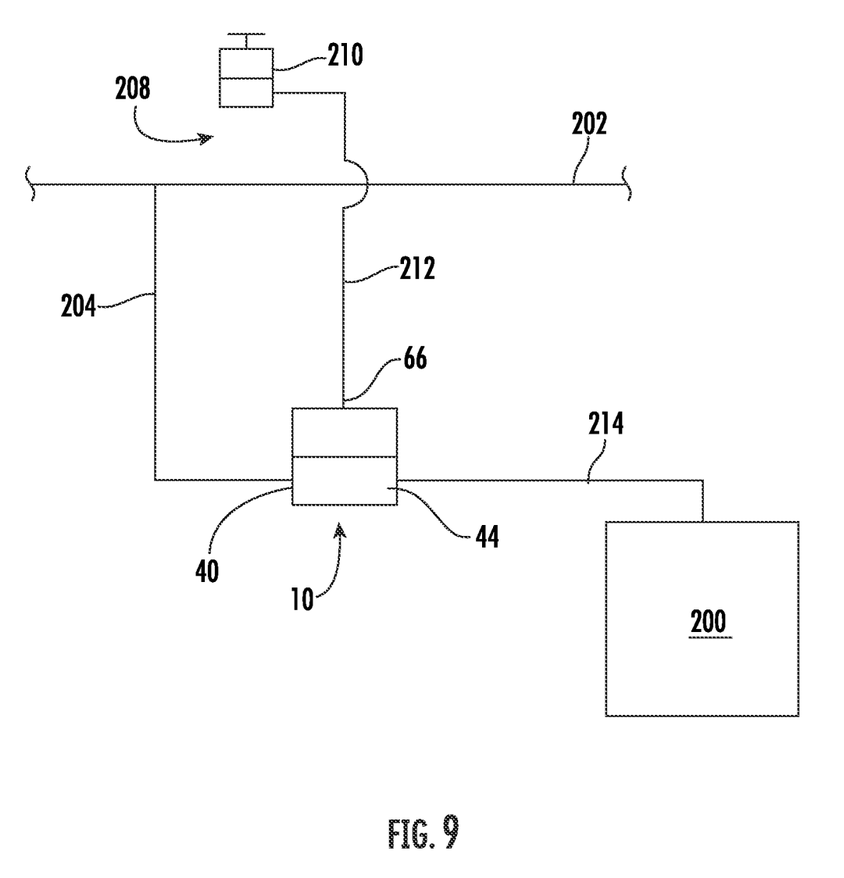
FIG. 9 is a cross-sectional view of an alternative pressure regulator.

FIG. 9 is a schematic representation of a representative industrial process incorporating the pressure regulator 10 (or alternatively, regulator 100) described above. This is but one of many types of process system which utilize a pressure reducing regulator. The system includes a process vessel 200 to be supplied with process fluid from a supply such as a water for injection ("WFI") manifold 202. The inlet port 40 of the pressure regulator 10 is connected to the WFI manifold 202 by an inlet line 204. The reference port 66 of the pressure regulator 10 is connected to a pressure reference source 208 (e.g., compressed air ported through a pilot regulator 210) by a reference line 212. The outlet port 44 of the pressure regulator 10 is connected to the process vessel 200 by an outlet line 214.

The pressure regulator described above has numerous advantages over prior art pressure regulators. It is of simple construction and in sufficiently economical that it can be considered single-use and/or disposable. These regulators have the capability to minimize disposal waste of materials. They present few wetted materials in their construction. They may be made from materials that can be sterilized and are compatible with biochemical processes such as USP class VI certified and BPA-free polymer. All materials can be stable to gamma radiation, and there are no large metallic components that would render gamma radiation shadows.

The foregoing has described single-use pressure regulators. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A centerbody assembly for a pressure regulator, comprising:
   a centerbody having:
   a process surface,
   at least one outlet orifice disposed in the centerbody;
   an outlet port positioned in fluid communication with the at least one outlet orifice;
   an inlet port;
   a valve chamber positioned in the centerbody in fluid communication with the inlet port, the valve chamber including a valve seat positioned in fluid communication with the process surface;
   a transition conduit extending between the valve seat and the process surface; and
   at least one damping port extending from the transition conduit to the process surface, wherein a longitudinal axis of the at least one damping port is disposed at an acute angle to the process surface;
   a spherical valve element disposed in the valve chamber and moveable between an open position in which it is spaced away from the valve seat, and a closed position in which it seals against the valve seat;

a flexible control diaphragm facing the process surface, wherein a perimeter of the control diaphragm is bonded to the centerbody so as to define a seal that blocks the passage of fluid; and wherein the valve element is mechanically interconnected with the control diaphragm.

2. The centerbody assembly of claim 1, wherein the at least one damping port discharges into a recess formed in the process surface.

3. The centerbody assembly of claim 1, wherein there are a plurality of damping ports and they are arranged in a radial array.

4. The centerbody assembly of claim 1, further comprising a spring element disposed in the valve chamber and configured to urge the valve element towards the closed position.

5. The centerbody assembly of claim 1 wherein the centerbody comprises a polymer.

6. The centerbody assembly of claim 1 wherein the control diaphragm comprises a polymer.

7. The centerbody assembly of claim 6 wherein the periphery of the control diaphragm is bonded to the centerbody with a thermal bond.

8. The centerbody assembly of claim 1, wherein:
the centerbody includes a back surface opposite the process surface; and
a flexible backside diaphragm is bonded to the back surface of the centerbody.

9. The centerbody assembly of claim 1, wherein the centerbody includes:
a back surface opposite the process surface;
a peripheral surface that extends between the process surface and the back surface;
an inlet fitting extending outward from the peripheral surface; and
an outlet fitting extending outward from the peripheral surface.

10. The centerbody assembly of claim 9, further comprising a flexible backside diaphragm positioned facing the back surface, and a perimeter of the backside diaphragm is bonded to the centerbody.

11. The centerbody assembly of claim 1, wherein a strut is positioned between the control diaphragm and the spherical valve element.

12. The centerbody assembly of claim 11, wherein:
the strut includes a shaft passing through the centerbody, with a lower end that contacts the valve element; and
a disk is formed at the upper end of the shaft.

13. The pressure regulator comprising the centerbody assembly of claim 1, in combination with an enclosure assembly including a top cap adapted to be disposed in fluid communication with a fluid at a predetermined reference pressure, wherein the control diaphragm is positioned between the centerbody and the top cap.

14. A centerbody assembly for a pressure regulator, comprising:
a centerbody having:
a process surface,
at least one outlet orifice disposed in the centerbody;
an outlet port positioned in fluid communication with the at least one outlet orifice;
an inlet port;
a valve chamber positioned in the centerbody in fluid communication with the inlet port, the valve chamber including a valve seat positioned in fluid communication with the process surface;
a spherical valve element disposed in the valve chamber and moveable between an open position in which it is spaced away from the valve seat, and a closed position in which it seals against the valve seat;
a flexible control diaphragm facing the process surface, wherein a perimeter of the control diaphragm is bonded to the centerbody so as to define a seal that blocks the passage of fluid;
wherein the valve element is mechanically interconnected with the control diaphragm; and
wherein a ratio of a diameter of the spherical valve element to a diameter of the inlet port is between 1.1 and 1.6.

15. A centerbody assembly for a pressure regulator, comprising:
a centerbody having:
a process surface,
at least one outlet orifice disposed in the centerbody;
an outlet port positioned in fluid communication with the at least one outlet orifice;
an inlet port;
a valve chamber positioned in the centerbody in fluid communication with the inlet port, the valve chamber including a valve seat positioned in fluid communication with the process surface;
a spherical valve element disposed in the valve chamber and moveable between an open position in which it is spaced away from the valve seat, and a closed position in which it seals against the valve seat;
a flexible control diaphragm facing the process surface, wherein a perimeter of the control diaphragm is bonded to the centerbody so as to define a seal that blocks the passage of fluid;
wherein the valve element is mechanically interconnected with the control diaphragm; and
wherein a maximum movement of the spherical valve element between the closed and open positions is between 5% and 30% of a diameter of the spherical valve element.

16. A centerbody assembly for a pressure regulator, comprising:
a centerbody having:
a process surface,
at least one outlet orifice disposed in the centerbody;
an outlet port positioned in fluid communication with the at least one outlet orifice;
an inlet port;
a valve chamber positioned in the centerbody in fluid communication with the inlet port, the valve chamber including a valve seat positioned in fluid communication with the process surface;
a spherical valve element disposed in the valve chamber and moveable between an open position in which it is spaced away from the valve seat, and a closed position in which it seals against the valve seat;
a flexible control diaphragm facing the process surface, wherein a perimeter of the control diaphragm is bonded to the centerbody so as to define a seal that blocks the passage of fluid;
wherein the valve element is mechanically interconnected with the control diaphragm; and
wherein a sealing ring diameter is defined as a diameter of a ring defining contact between the spherical valve element and the valve seat; and a ratio of the sealing ring diameter divided by ball diameter is between 0.5 and 1.

* * * * *